United States Patent [19]

Hoglund

[11] 3,857,185

[45] Dec. 31, 1974

[54] APPARATUS FOR INSPECTING THE ACCURACY OF COMPLEXLY CONTOURED PRECISION SURFACES

[75] Inventor: Nils O. Hoglund, Short Hills, N.J.

[73] Assignee: Tri-Ordinate Corporation, Berkeley Heights, N.J.

[22] Filed: July 12, 1973

[21] Appl. No.: 378,438

[52] U.S. Cl. ............. 33/174 P, 33/174 Q, 33/1 BB
[51] Int. Cl. ............................................. G01b 5/20
[58] Field of Search ........... 33/174 R, 174 L, 174 P, 33/174 Q, 1 BB, 27 R, 169 R, 172 R, 172 B, 147 L; 74/805

[56] References Cited
UNITED STATES PATENTS

| | | | |
|---|---|---|---|
| 2,686,370 | 8/1954 | Walker et al. | 33/174 P |
| 2,692,439 | 10/1954 | Wilson | 33/174 Q |
| 3,221,413 | 12/1965 | Fesser | 33/174 P |
| 3,800,621 | 4/1974 | Hoglund | 51/101 R |

*Primary Examiner*—Samuel B. Rothberg
*Assistant Examiner*—Willis Little
*Attorney, Agent, or Firm*—Pennie & Edmonds

[57] ABSTRACT

A precision-machined surface inspecting apparatus having two members with specially shaped surfaces mounted for movement relative to each other in contacting relationship, a positional read-out indicator connected in alignment with a fixed point on one of the members for movement therewith; the contacting surfaces of the two members cooperatively engaging each other such that the said fixed point on said one member moves along a path corresponding to the ideal contour of the surface to be inspected with neither of the engaging surfaces of the two members having a contour or shape corresponding to said ideal contour.

16 Claims, 14 Drawing Figures

APPARATUS FOR INSPECTING THE ACCURACY OF COMPLEXLY CONTOURED PRECISION SURFACES

BACKGROUND OF THE INVENTION

In manufacturing structural elements such as metal machine parts, it is often necessary that the element have a finished surface of particular design and shape. In addition, it is often important that the finished surface having extremely accurate dimensions both in relation to surface smoothness and in relation to its location or orientation relative to the element proper. As an example, machine elements which are adapted to cooperate in a sliding, gearing or camming relation must have cooperating surfaces exactly shaped and precisely machined within minute tolerances. Where these surfaces are straight, circular, or some other common shape, the shaping and machining is not too difficult. Where, however, the desired surface of the element or part is a complicated curve, as for example, one having an ever changing radius of curvature, the machining thereof becomes both difficult and expensive.

The problems encountered in shaping and machining complexity contoured surfaces are described in my U.S. Pat. No. 3,663,188 which issued on May 16, 1972. This patent discloses a cam controlled grinding machine for grinding to extremely accurate dimensions both external and internal surfaces having complex contours.

Once these precision ground contoured surfaces are formed, the next problem encountered occurs in the quality control phase of the manufacturing operation. In this phase the finished surface must be inspected and tested for dimensional accuracy before it can be released for installation in the ultimate assembly. All alluded to previously, the finished part must be checked to determine (1) whether the finished surface is located or positioned properly with respect to the part itself and (2) whether the surface is properly shaped and (3) whether the face of the surface itself has the required dimensional precision or smoothness.

According to the teachings of my prior patented invention (U.S. Pat. No. 3,663,188) the precision surface of the workpiece or machine part is formed by moving a grinding wheel and the surface to be ground on the workpiece relative to each other along a path corresponding to the contour of the workpiece surface to be ground. This path of relative movement between the workpiece surface and the grinding wheel is defined by a cam member, the cam surface of which is polished to a precise contour identical with the desired surface to be ground on the workpiece.

In the construction shown in the drawings of my aforementioned U.S. patent, a cam drive follower engages the precisely contoured cam member surface and acts, upon being rotated, to feed the cam member along a path corresponding to the precisely contoured surface. The workpiece is fixed to the cam member for movement therewith along said path. The grinding wheel is rotated about its own axis and engages along the moving surface of the workpiece to be ground.

My patented grinding machine can be readily converted for use as a contour gauging or inspecting instrument simply by replacing the grinding wheel with a suitable indicator which is responsive to positional variations in the finished surface of the workpiece. For example, one or more conventional read-out indicators of the type equipped with a movable spring-loaded sensing plunger substituted for the grinding wheel so that the nose of sensing plunger engages along the finished workpiece surface will serve nicely for this purpose.

The present invention provides yet another apparatus for inspecting the dimensional accuracy of a precision machined contoured surface of a workpiece; the apparatus herein disclosed being based upon operational concepts which are different from the concepts utilized in my prior patented device.

SUMMARY OF THE INVENTION

In accordance with the teachings of the present invention, applicant has provided an apparatus or instrument for rapidly and conveniently inspecting both internal and external precision machined surfaces of complicated and uncommon contour to determine whether the shape, position and finish of any given surface is within acceptable tolerances. As with applicant's prior patented apparatus (described above) the apparatus herein disclosed is particularly suited for inspecting internal surfaces as, for example, the internal cavity of the stator part of a Wankel-type engine.

It will be recognized that the cavity surface of the Wankel type engine is roughly eliptical but not truly eliptical. The difficulties encountered in producing the cavity surface of the stator part economically on a production line basis have largely been overcome by the machine disclosed in my previously mentioned U.S. Pat. No. 3,663,188. But, as with any machinery, the chance of producing an unacceptable part is always present. To eliminate the possibility that a final assembly will have a defective part, it is prudent that each critical part be checked for machining accuracy. Inspection of the stator part of a Wankel engine is especially necessary inasmuch as the seemingly most minute surface imperfection in the cavity wall may result in undue wear by the internally driven rotor engaging this wall or it may result in engine malfunction due to improper mating of the rotor with the cavity wall surface of the stator.

In construction, the inspection apparatus of the present invention includes a table for supporting the workpiece and a positional read-out indicator device which is moved relative to the workpiece along a path of travel corresponding to the theoretically perfect contour which, optimally, the surface of the workpiece to be inspected should possess. The sensing member of the indicator engages along the surface of the workpiece to be inspected during this movement along the desired (or theoretically perfect) path. Where the workpiece comprises the stator of a Wankel type engine, this theoretically perfect contour defines an endless closed configuration corresponding to the configuration desired for the internal wall cavity of the stator. The workpiece supporting table has an annular configuration with the read-out indicator situated generally within the central opening of the table to engage against the inner wall surface of the stator workpiece.

To effect relative movement between the workpiece surface and the read-out indicator, a driven true motion generating means is provided. As presently preferred, this generating means mounts the read-out indicator for movement along the desired path relative to the workpiece surface which is held in a stationary position on its supporting table. Structurally, the generating means includes a first member which is fixedly mounted on the frame of the apparatus and a second member mounted for movement relative to the first member in contacting relationship to the first member. A drive means is included for moving the second member relative to the first fixed member. The contacting surface of neither of the members has a shape corresponding to the desired contour of the surface of the workpiece being inspected. The contacting surfaces of the two members are, however, cooperatively shaped such that a predetermined point on the second member will move through the desired path. The read-out indicator is connected to the second member in such a way that it moves along the same path as this predetermined point.

As presently preferred, the read-out indicator has a mechanical type sensing member in the form of a plunger normally biased toward the workpiece surface into engagement therewith. The plunger is protractable or retractable along a straight line in a direction extending, respectively, toward or away from the workpiece surface when a positional variation in that surface is encountered; the direction of movement of the plunger being, of course, dependent upon whether the path defined by the actual workpiece surface lies outwardly or inwardly of the theoretical path which the readout indicator follows. According to the present invention, the line through which the sensing member acts in detecting a surface irregularity or positional variation is maintained in a plane extending perpendicular to the surface of the workpiece being inspected at each point therealong. Thus, a true reading is always obtained because, with this normality condition, the sensing member of the read-out indicator will not deviate from the theoretical contour desired other than in response to encountering an actual surface defect.

DESCRIPTION OF THE PREFERRED EMBODIMENTS

Figure 2:
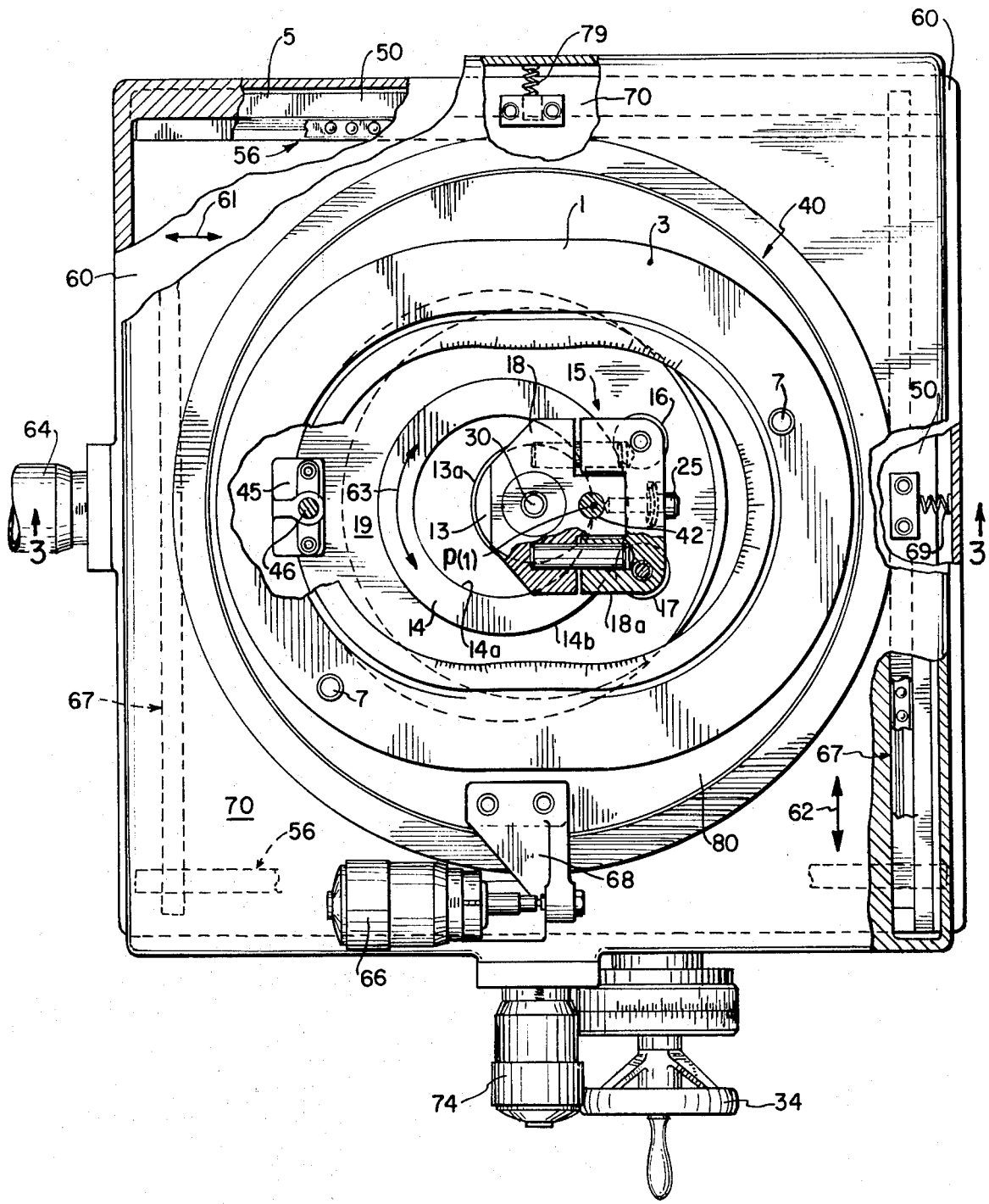
FIG. 2 is a top plan view of an inspecting apparatus according to the present invention as viewed through the line 2—2 in FIG. 3 and partially broken away at selected portions.
Figure 3:
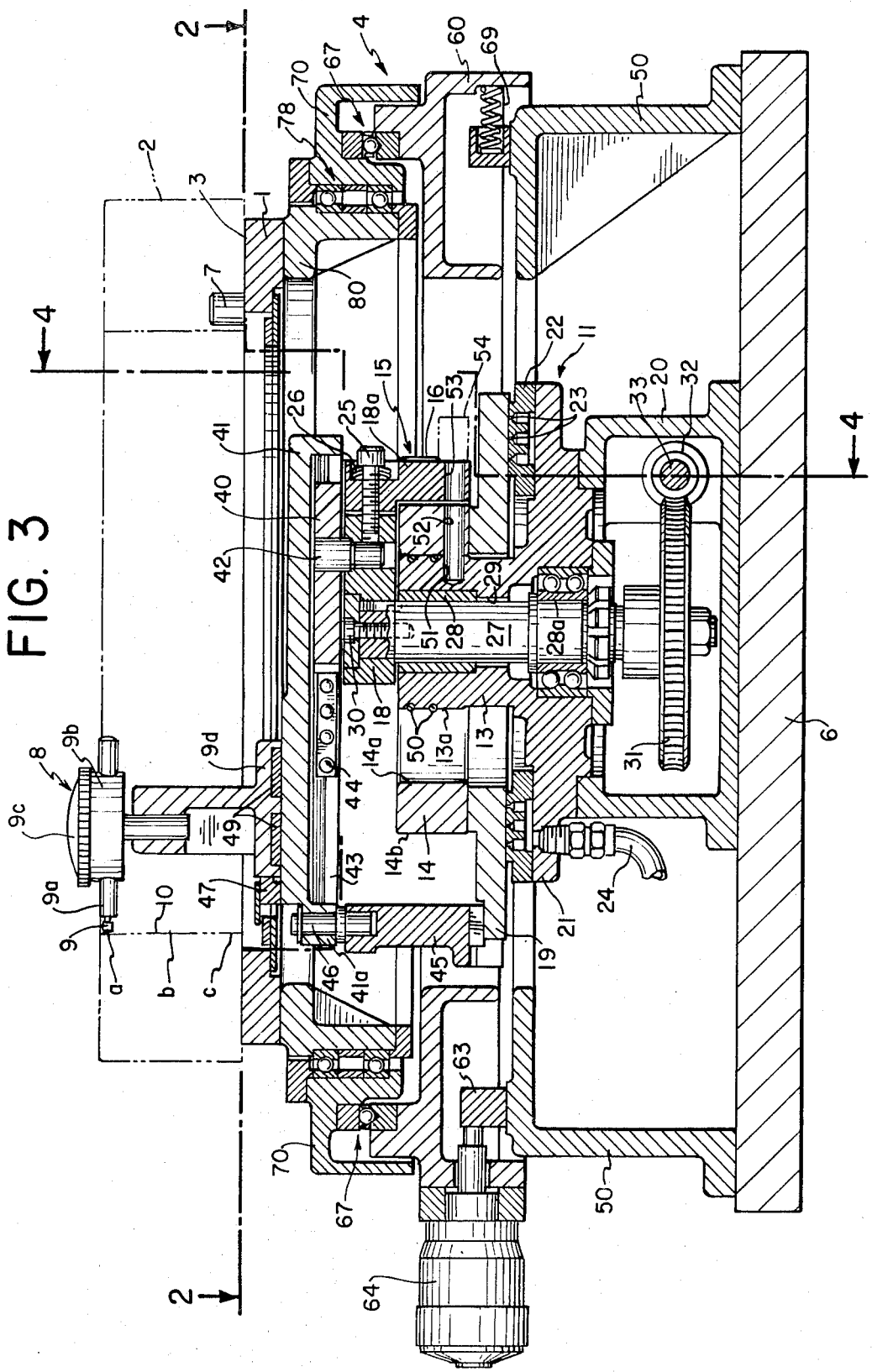
FIG. 3 is a cross-sectional view of an inspecting apparatus according to the present invention as viewed along the line 3—3 of FIG. 2.
Figure 4:
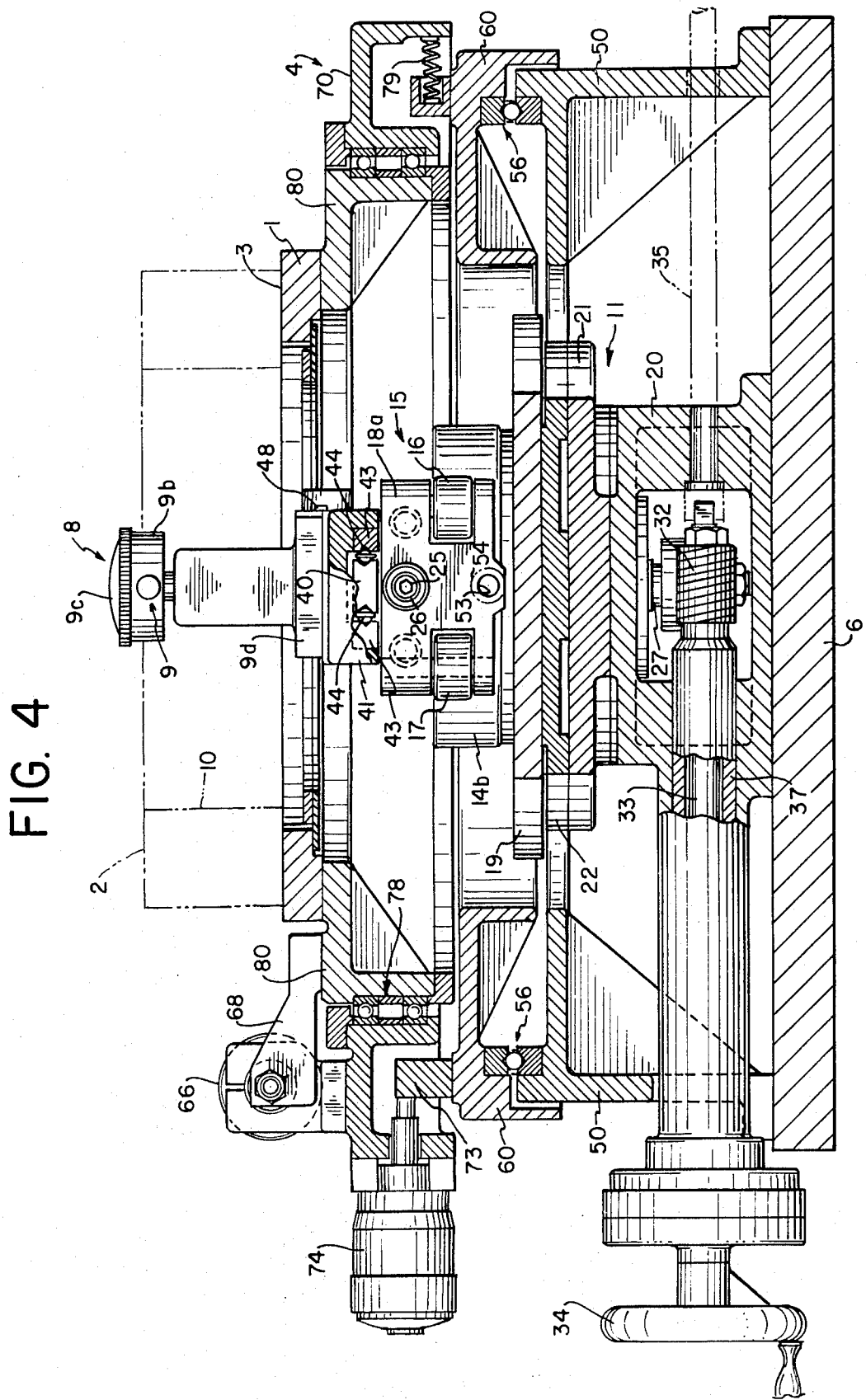
FIG. 4 is a cross-sectional view of an inspecting apparatus according to this invention as viewed along the irregular line 4—4 in FIG. 3.

With the initial reference to FIGS. 2–4, the inspecting apparatus of the present invention includes an annular oval-shaped supporting table 1 which is adapted to support a workpiece 2 on its upper surface 3. The table 1 is movably mounted for adjustment in three directions by a support bearing means 4 supported on base 6 of the apparatus. The support bearing means 4 will be described more fully in a later portion of this description.

The workpiece 2 is held fixed relative to table 1 by a pair of precisely positioned locating dowels 7 projecting upward from surface 3 of the table. Dowels 7 are receivable within corresponding locating holes in the workpiece which are formed during manufacture of the workpiece. The sensing member 9 of a conventional positional read-out indicator 8 engages against the internal precisioned machined surface 10 of the workpiece; this surface 10 being the one to be inspected for dimensional accuracy by the inspecting apparatus.

According to this invention, the read-out indicator is mounted for movement along a path having a contour corresponding to the theoretically perfect contour which the internal surface 10 to be inspected should, optimally, possess if perfect precision had been attained in the previous machining operation. During movement of the read-out indicator along this path the table 1 and thereby workpiece 2 is maintained in a stationary position. To produce movement of indicator 8 along the desired path corresponding to the optimum contour of surface 10, a true-motion generating means 11 mounting indicator 8 is provided. This motion generating means is supported on base 6 so as to be located centrally of annular table 1. In the particular embodiments of the invention disclosed, the path of travel described by the read-out indicator in response to actuation of the motion generating means corresponds exactly to the ideal contour or shape of the cavity wall surface of the stator of a Wankel type engine. This contour is most clearly shown in FIG. 1 where it is indicated by line 12. It will be recognized that such a contour has a changing radius of curvature.

Figure 1:
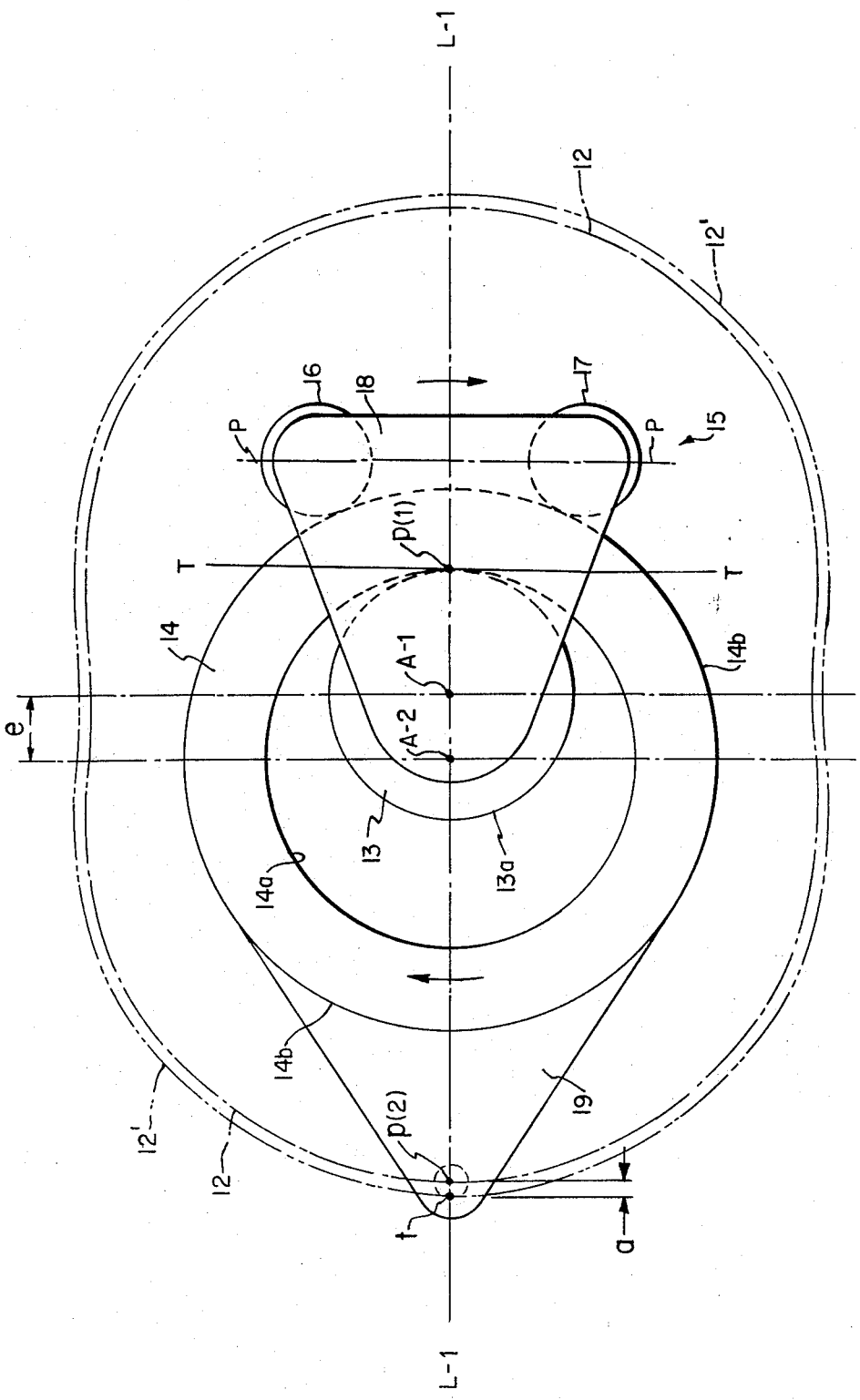
FIG. 1, 1a and 1b are schematic views of one embodiment of the motion generating means utilized, in an inspecting apparatus according to this invention, to create relative movement between the read-out indicator and workpiece surface along the true or theoretically perfect path.
Figure 1A:
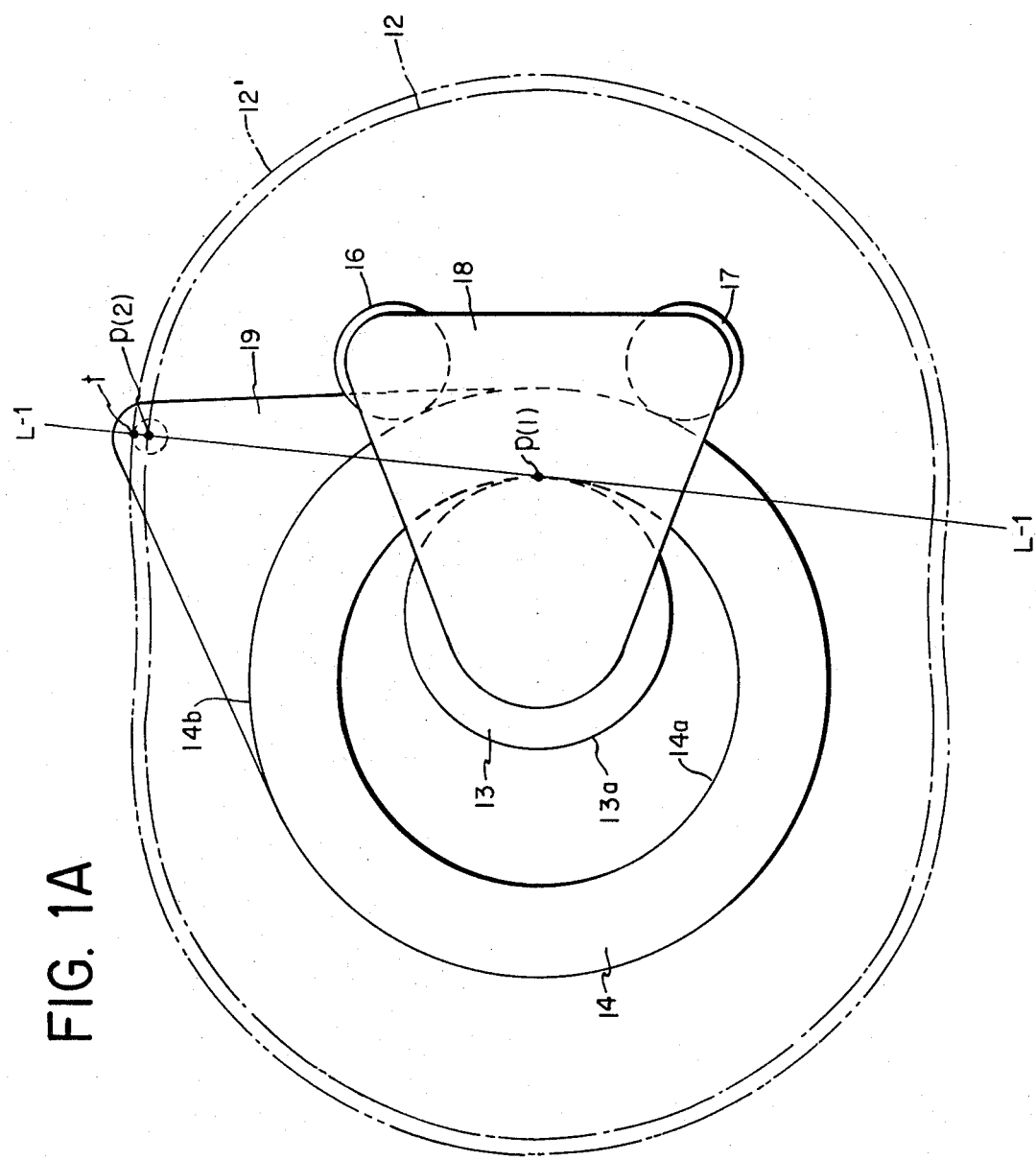
Figure 1B:
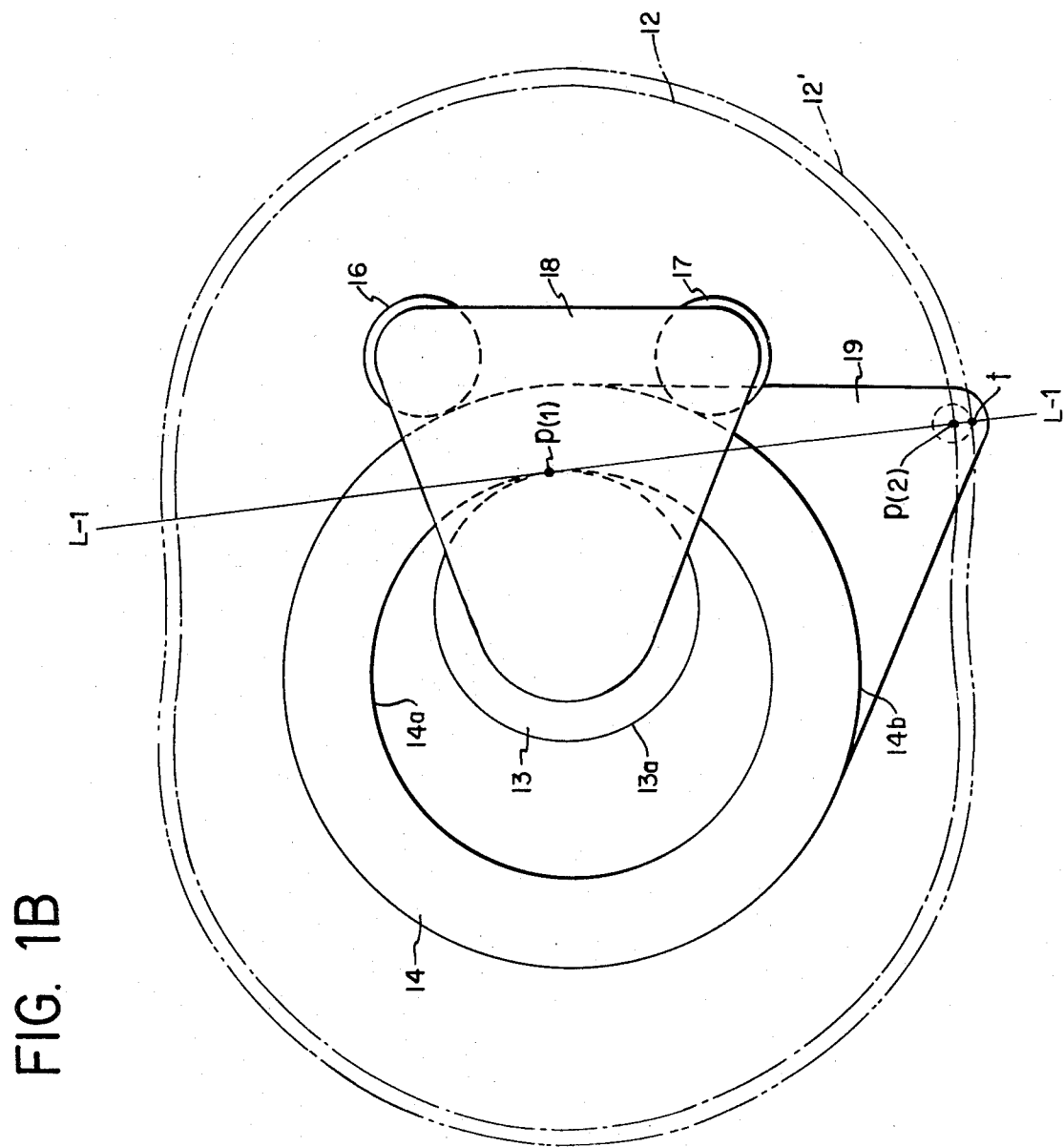

The true-motion generating means comprises a stationary spindle 13 and a movable ring element 14 cooperatively engaging spindle 13 to produce the desired motion. The nature of this cooperation can be best described in connection with FIGS. 1, 1a and 1b to which reference is now made. As shown in FIG. 1, the external surface 13a of spindle 13 and the internal surface 14a of ring 14 are each circular in shape with the diameter of spindle 13 being less than the diameter of ring 14 as measured across the external surface 13a of spindle 13 and across the internal surface 14a of ring 14, respectively. As shown, spindle 13 is disposed within ring 14 with its external surface 13a engaging the internal surface 14a of ring 14 at the point $p(1)$. At this point it will be recognized that the two surfaces 13a, 14a are tangent to each other. This tangent is represented by the line T. The center axis A–1 of spindle 13 and the center axis A–2 of ring 14 are situated eccentrically with respect to each other. That is, the center axis A–2 of ring 14 is located eccentrically of spindle 13 and the center axis A–1 of spindle 13 is similarly located eccentrically of ring 14; the eccentricity in both cases being equal to the distance $e$ between axes A–1, A–2. The size of the cavity of a Wankel type engine is a function of the eccentricity $e$. To form a cavity of the desired contour with the ring and spindle assembly described, the diametrical sizes of surfaces 13a, 14a must be in the ratio of 2:3. In the construction shown, the diameter of surface 13a is equal to four times the eccentricity while the diameter of surface 14a is equal to 6 times the eccentricity.

With the ring and spindle arrangement thus far described, any point relative to ring 14, say point $p(2)$ on ring extension plate 19 connected to ring 14, will be moved along a path defined by the line 12 as the ring 14 is rolled around the surface 13a on spindle 13. Also, a line L–1 extending through the contact point $p(1)$ and a describing point $p(2)$ extends normal to the path described by point $p(2)$.

As ring 14 rolls around spindle 13, the point of contact $p(1)$ therebetween will move along a circular path defined by the surface 13a with the location of the points of engagement on the respective surfaces 13a, 14a changing accordingly. The contact point $p(1)$ will make three complete revolutions around surface 13a before the contour describing point $p(2)$ describes one complete pass and returns to its starting point. Thus, after one complete clockwise circumscription of contact point $p(1)$ about the surface 13a the describing point $p(2)$ will have passed through an angle of 120° to the position shown in FIG. 1a; after two complete circumscriptions it will lie at the position shown in FIG. 1b 240° removed from its place of beginning; and finally, after circumscribing surface 13a for the third time, it will arrive again at its beginning point.

By extending the describing point $p(2)$ outwardly to point $t$, the contour represented by line 12' is generated. Where the contour to be described is that of a stator cavity of a Wankel type engine, the optimal contour or shape desired is defined by the line 12'. As will be seen from FIG. 1, line 12' is parallel to the path or line 12 described by the describing point $p(2)$. The distance between these two lines is known to persons skilled in the art as the apex radius $a$.

The spindle 13 and the ring 14 may be broadly described as two relatively movable members cooperatively engaging each other such that a fixed point on one of the members (i.e., the ring) will, as these members are moved relative to each other, describe a path corresponding to the desired contour of the surface to be inspected. Neither of the engaging surfaces of the members, however, individually has a contour corresponding to the desired contour.

For the purpose of rolling ring 14 about spindle 13 in the manner described a drive means is provided. According to this invention, this drive means includes a ring pushing means 15 engaging against the external surface 14b of ring 14 to urge it into contact with spindle 13. The ring pushing means includes a pair of freely rotatable push rollers 16 and 17 mounted on a bracket 18 rotatable about an axis lying coincident with the center axis A–1 of spindle 13. These rollers are mounted on a push roller assembly 18a, attached to bracket 18, with their axes of rotation disposed in a plane P parallel to tangent T. The ring pushing means is urged against ring 14 to produce a resultant force acting along a line extending perpendicular to plane P through contact point $p(1)$. This maintains the ring 14 in proper engagement with the spindle 13. As bracket 18 is rotated in, say, a clockwise direction as viewed in FIG. 1, the rollers 16 and 17 will roll about the external surface 14b of ring 14, in turn, pushing the internal surface 14a of ring 14 with a rolling movement about the external surface 13a of spindle 13. Thereby the fixed point $t$ on the ring extension plate 19 attached to the bottom of ring 14 will move along a path corresponding to the desired contour; the point $t$ being a point lying along line L–1 spaced from point $p(2)$ by the distance $a$.

With reference to FIGS. 2–4, the spindle 13 is supported atop gear housing 20 seated on base 6. The spindle 13 has a lower flange 21 supporting an annular gas bearing block 22 which, in turn, axially supports the ring 14, via extension plate 19, in a frictionless condition as it moves about spindle 13 in the manner described above. Pressurized gas is supplied to the jets 23 in the bearing block 22 via gas supply line 24.

As shown, the push roller assembly 18a is attached to bracket 18 by an adjustable shoulder bolt 25 which, by means of spring washers 26, yieldingly urges the push rollers 16, 17 into engagement with external surface 14b of ring 14. For rotating the bracket 18 to move the push rollers 16, 17 about ring 14, there is provided a shaft 27 which is journalled by solid bearing sleeve 28 and ball bearing sleeve 28a for rotation in central bore 29 extending longitudinally through spindle 13. At its upper end the shaft 27 is connected to bracket 18 by shoulder bolt 30. The lower end of shaft 27 which extends into housing 20 carries a driven gear 31. Gear 31 meshes with driven worm gear 32 mounted on shaft 33. Shaft 33 may be rotated by handwheel 34 as shown or it may be connected to a suitable motor (not shown) as, for example, by a connecting shaft indicated by dotted lines 35 in FIG. 4. Shaft 33 is rotatably supported within an eccentric sleeve 37 in a conventional manner so as to reduce backlash between the driven gear 31 and worm gear 32 during operation.

As mentioned previously, the read-out indicator 8 shown in the drawings is equipped with a spring-loaded sensing member or plunger 9 which is slidably mounted within a fixed mounting sleeve 9a attached to the body 9b of the indicator. After being preset to the proper position, a positional variation in the surface along which the nose of the plunger is run will cause the plunger to move outwardly or inwardly of its mounting sleeve to thereby cause a positive or negative reading on the dial 9c of the indicator, depending on the direction of its movement.

With reference again to FIG. 1, it will be observed that the desired contour has a changing radius of curvature. The distance between the describing point $t$ and point-of-contact $p(1)$ will vary as ring 14 rolls around spindle 13 to describe the desired contour. The indicator 8 is mounted not only to move with the ring 14 along the desired contour generated by point *t* on ring extension plate 19 but, in order to insure accurate and true readings, it is also mounted in such a manner that the line of action or movement of its sensing plunger 9 is always maintained normal to its direction or path of movement. In moving with the ring 14 along a path corresponding to the desired contour, it will be recognized the indicator must undergo two distinct motions. One of these is a translational one directed along the path described by the describing point *t*. The other motion is a reciprocal one directed normal to this path in response to the expected variations in the distance between the describing point *t* and contact point *p*(1). For this purpose, a slide-guide means is provided for mounting the indicator 8.

As best shown in FIG. 3, the slide-guide means includes a guide member 40 and a slide member 41. The guide member 40 is pivotally mounted about an axis intersecting the point of contact *p*(1) between surfaces 13*a*, 14*a* of spindle 13 and ring 14, respectively. For this purpose, a pivot pin 42 which pivotally supports guide member 40 is seated on bracket 18 as shown. The center axis of pivot pin 42 intersects contact point *p*(1). The slide member supports the read-out indicator and is externally supported on the guide member for reciprocal longitudinal movement relative thereto. To permit this reciprocal movement a bearing block 43 containing a row of captured ball bearings 44 is mounted internally along each side of the slide 41 in rolling engagement with the respective side of the guide member 40, as best shown in FIG. 4.

Referring again for the moment to FIGS. 1 and 1*a*, it will be seen that the angular position that line L–1 (i.e., a line extending through contact point *p*(1) and describing point *t*) relative to ring 14 varies as the ring rolls around spindle 13. This variation in angular position can be best understood by comparing the orientation of line L–1 for the ring position shown in FIG. 1 with its orientation for the ring position shown in FIGS. 1*a* and 1*b*. As stated above, line L–1 extends normal to the path of movement of describing point *t*. In order to maintain the line-of-action of the read-out indicator normal to this path, its support (i.e., the slide) must be maintained along the line L–1. But, since the line L–1 changes its angular orientation relative to the ring, the slide must also be capable of changing its angular orientation as the ring 14 rolls around the spindle 13.

For the purpose of enabling the slide to move with the ring 14 along the desired path, the slide is connected to the ring extension plate 19 by a coupling member 45. And, for the purpose of enabling the slide 41 to change its angular orientation relative to the ring 14 during its translational movement along the desired path, a pivotal connection between the slide 41 and coupling 45 is provided. As shown, this connection comprises pivot pin 46 seated in the upper end of the coupling member and extending into a receiving hole in a stepped down portion 41*a* of slide 41. The axis of the pin 46 extends through the describing point *p*(2). It will thus be seen that the slide 41 is connected to the ring 14, via extension plate 19, for translational movement along the path described by the point *p*(2) on extension plate 19 and for pivotal movement relative to the extension plate to account for expected changes in its angular orientation relative to ring 14.

The read-out indicator 8 is precisely positioned on slide 41 so that the nose of the sensing plunger 9 is aligned with the describing point *t* on ring extension plate 19. For this purpose, a pair of positioning blocks 47 and 48 which are arranged to abut the base 9*d* of the indicator 8 are fixed to slide 41. The indicator, itself, is held in abutment with the positioning blocks by a magnetic force created by magnets 49 set in the base 9*d* of the indicator.

It is important that no slippage between contacting spindle surface 13*a* and ring surface 14*a* occur as the ring is rolled about the spindle. While frictional forces between these surfaces 13, 14*a* are normally expected to be sufficient to prevent slippage, rubber O-rings 50 extending about surface 13*a* of the spindle are provided to insure against such slippage.

In order to properly inspect a workpiece it is important that the initial relative positions between the various movable components of the true-motion generating means be proper. Namely, the slide-guide means, the spindle 13 and the ring 14 must be properly positioned relative to each other before inspection begins. The initial relative positions of these elements is proper when the point of contact *p*(1) between surfaces 13*a* and 14*a*, the center axis A–1 of spindle 13 and the describing point *t* on ring extension plate 19 lie along a straight line. According to this invention the apparatus includes an alignment means to insure that this condition is met before inspection of any workpiece begins. This means includes a radial aligning hole 51 in spindle 13, another radially directed aligning hole 52 in ring 14 and radially directed aligning hole 53 in the push-roller assembly 18*a* mounting the push rollers 16, 17. When these three holes 51, 52, 53 are aligned, the contact point *p*(1), center axis A–1 and describing point *t* will lie in a straight line. Alignment of these holes may be easily determined by inserting a headed alignment pin 54 having a shank equal in length to the combined length of the three holes into the hole 53. If the shank of pin 54 can be fully inserted the three holes are aligned and the proper relative positioning has been attained.

It is also important that the workpiece itself be properly positioned relative to the motion generating means to perform a valid inspection. Where the workpiece is a stator part of a Wankel type engine, this is extremely important from the standpoint of being able to check the location of the cavity wall surface relative to the stator part itself. For this purpose, the workpiece supporting table 1 is mounted for selective positional adjustment in three directions by the support bearing means 4. Namely, the table is mounted for rotational movement to provide it with the capability of preadjusting its angular position. It is also mounted for linear movement along two horizontal perpendicularly disposed axes to provide positional pre-adjustment capability along these axes.

With reference to FIGS. 2–4, the support bearing means 4 includes four annular subtables 50, 60, 70 and 80 and three bearing assemblies 56, 67 and 78 for cooperating respectively with the subtable pairs 50–60, 60–70 and 70–80. As shown, subtable 50 is mounted on base 6 and forms a stationary supporting frame for movable support tables 60, 70 and 80. Suitable 50 supports subtable 60 for linear movement in the direction of arrow 61 by means of bearing assembly 56. Subtable 60, in turn, supports subtable 70 for linear movement in the direction of arrow 62 by means of bearing assembly 67. And, subtable 70 supports subtable 80 for rotational movement in the direction of arrow 63 by means of bearing assembly 78. The workpiece supporting table 1 is mounted on subtable 80 as shown.

Movement of subtable 80 in the indicated direction is accomplished by micrometer 66 which is mounted on subtable 70 and operatively connected to subtable 80 by arm 68 secured to subtable 80. Subtables 60 and 70 are biased to the full left position as viewed in FIGS. 3 and 4 by springs 69 and 79, respectively. Movement of subtables 60 and 70 in the respective directions is accomplished by the micrometers 64 and 74, respectively. The heads of micrometers 64 and 74 bear respectively against fixed abutment members 63 and 73 secured respectively to subtables 50 and 60 as shown.

Figure 5:
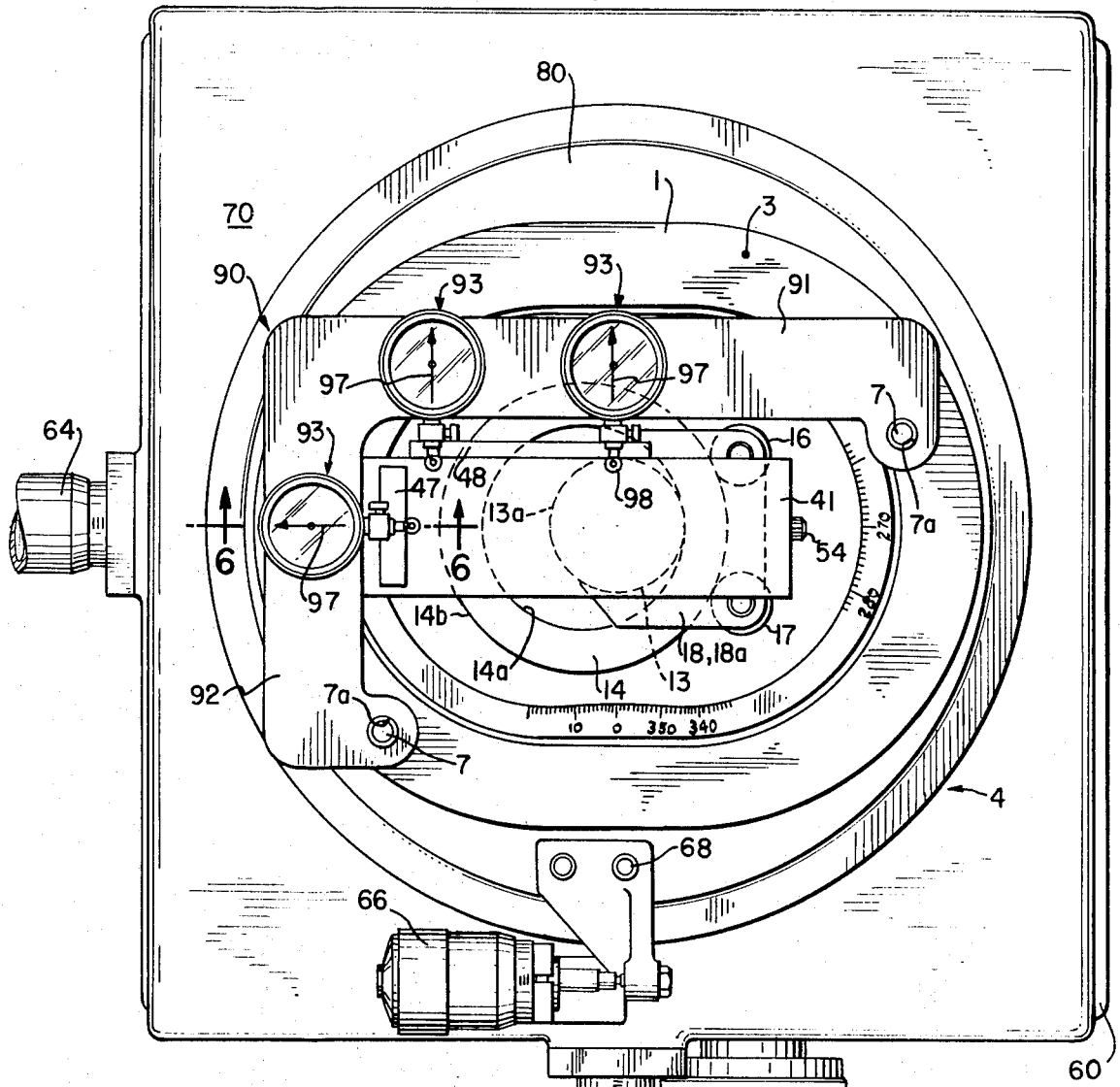
FIG. 5 is a top plan view of an inspecting apparatus according to the present invention showing a removable gauge in place on the apparatus for the purpose of prealigning the apparatus.
Figure 6:
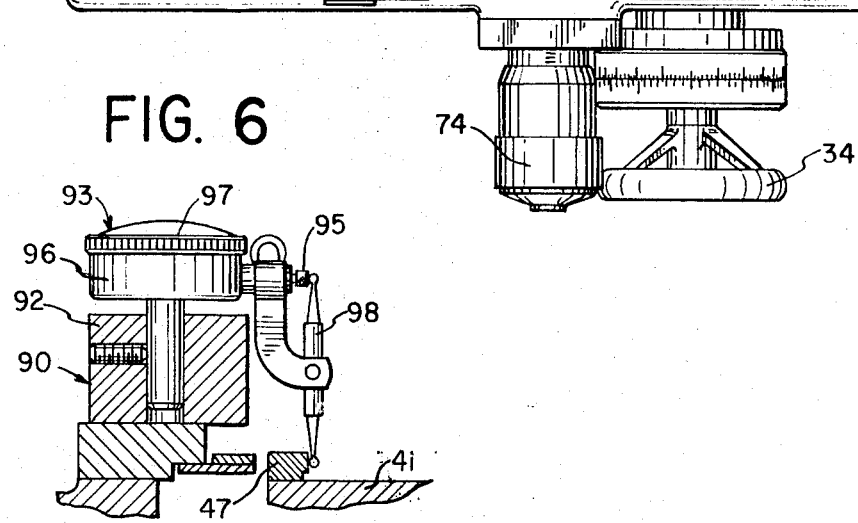
FIG. 6 is a cross-sectional view as viewed along the line 6—6 of FIG. 5.

In order to adjust table 1 to the correct position relative to the true motion generating means 11, a master gauge 90 is provided. Where the workpiece is the stator part of a Wankel type engine, master gauge 90, as shown in FIGS. 5 and 6, comprises a plate-like member having two legs 91 and 92 extending perpendicularly with respect to each other. The remote end of each leg 91 and 92 has a locating hole 7a adapted to receive one of the locating dowels 7 on table 1. Locating hole 7a, as well as dowels 7, are positioned with respect to each other exactly in accordance with the relative positions of similar locating holes formed in the stator part of the Wankel engine during its manufacture.

Mounted on the longer leg 91 are two conventional feeler gauges 93; and mounted on the short leg 92 is a single feeler gauge of the same type as gauges 93. As shown best in FIG. 6, each feeler gauge includes a spring-loaded sensing element 95 which is connected to the actuating mechanism (not shown) contained within housing 96. A dial indicator 97 is responsive to the actuating mechanism within the housing. The sensing element engages one end of a pivotally mounted feeler element 98 the other of which is adapted to engage the inside edge of one of the positioning blocks secured to slide 41. Thus, as shown in FIG. 5, the feeler elements of the gauges mounted on leg 91 engage at opposite ends of the inside edge of positioning block 48; the feeler element of the gauge mounted on leg 92 engaging at a central location the inside edge of positioning block 47.

The alignment gauge is preset by a precision master gauge (not shown) which serves to set the three feeler gauges to a zero reading indicative of the correct position of table 1 relative to the positioning blocks on slide 41.

To preset the table 1 in the correct initial position, the alignment gauge 90 is placed on locating dowels 7 on the table with the lower ends of the feeler elements engaging the respective positioning blocks on slide 41. If the feeler gauges all read zero, the table 1 is correctly positioned. If one or more do not read zero, the position of the table 1 must be adjusted until all the feeler gauges read zero. This is accomplished simply by adjusting the various micrometers 64, 66 and 74 until zero readings on all feeler gauges are obtained. During this adjustment process, the slide 41, ring 14 and spindle 13 are held in their correct relative positions by retaining the alignment pin 54 in the respective alignment holes 51, 52, 53.

After all prepositioning operations have been completed, the workpiece is placed on the table 1 and the indicator 8 is moved along a path corresponding to the perfect contour of the internal cavity wall surface by turning hand wheel 34. Readings taken at selected points along the surface are compared with known acceptable values to determine whether the cavity is properly located relative to the stator part itself. A continuous reading taken along the entire surface 10 will indicate the dimensional accuracy of the surface itself. Such continuous readings may be recorded in the form of a line chart for visual observation of unacceptable variations by connecting indicator 8 to suitable scribing equipment. Such a reading may also be fed directly into a computer for automatic comparison with acceptable values simply by converting the read-out signals to an electrical form understandable by a digital computer. While the inspection apparatus illustrated includes only a single read-out indicator, more than one indicator as, for example, a bank of stacked indicators engaging the cavity wall surface at points $a$, $b$, and $c$, could be used to inspect the cavity wall surface at different levels. The indicator 8 which is shown engages surface 10 at point $a$.

Where the workpiece is the stator part of a Wankel type engine, movement of read-out indicator 8 along a path corresponding to the theoretically perfect contour of the cavity wall surface may be produced by the alternative embodiment of the inspecting apparatus shown in FIGS. 7-12. The components of the construction shown in FIGS. 7-12 are in some instances substantially identical in structure to the components utilized in the construction of FIGS. 1 and 6. For example, the workpiece supporting table 1 and the support bearing means 4 mounting table 1 are identical. In other instances the components of the FIGS. 7-12 construction, while they are functionally equivalent, are structurally different from like components of the construction shown in FIGS. 1-6. Where components in the construction shown in FIGS. 7-12 are structurally identical, or substantially so, the same reference numerals used in FIG. 1-6 are used in FIGS. 7-12 and, in the interest of conciseness, such identical components will not be redescribed; reference instead being made to the description accompanying FIGS. 1-6. Where components in the construction shown in FIGS. 7-12 are structurally different but functionally equivalent, the same reference numerals used in FIGS. 1-6 followed by the superscript ( ′ ) are used in connection with the description accompanying FIGS. 7-12 to denote these functionally alike components.

Figure 7:
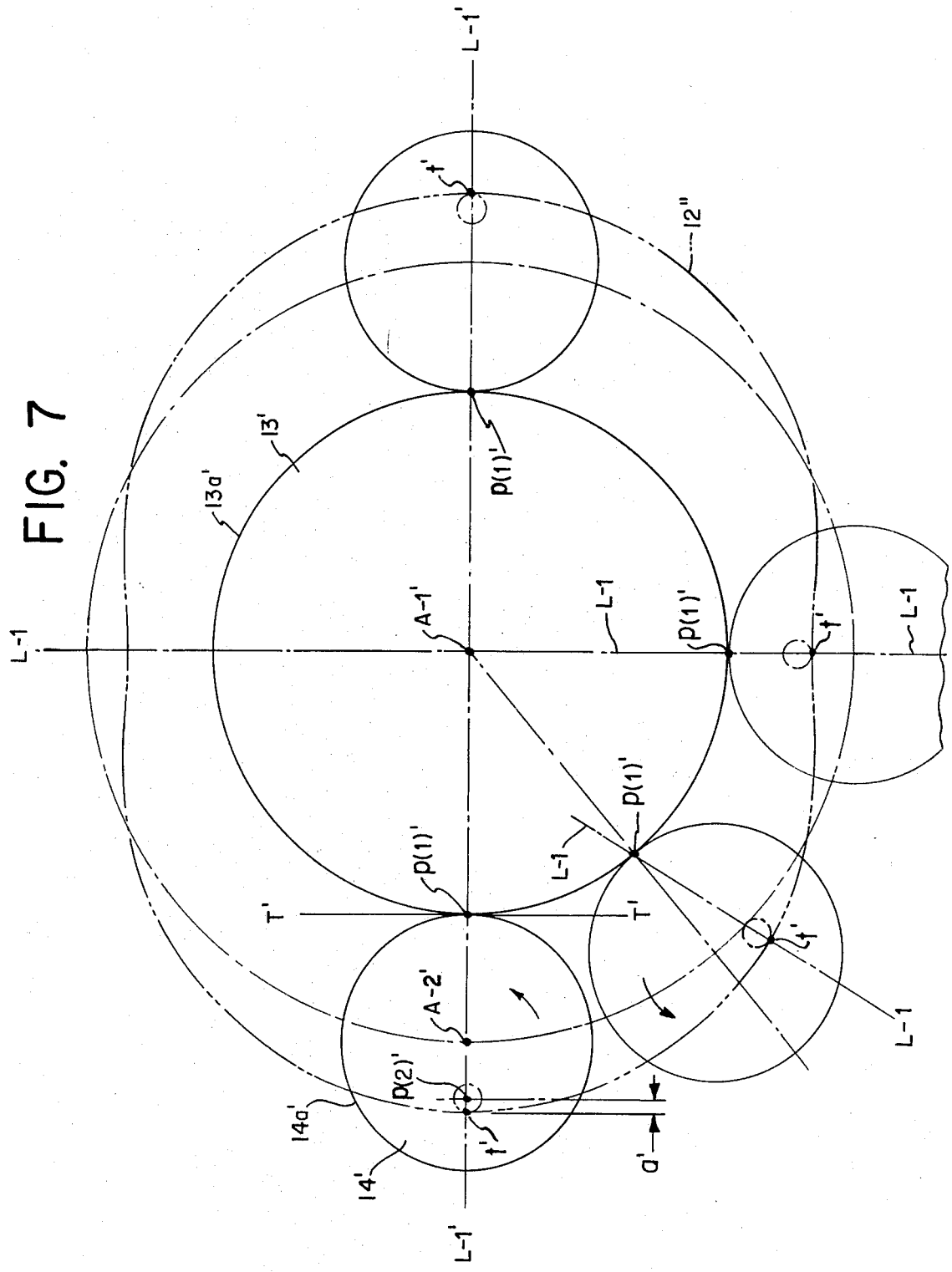
FIG. 7 is a schematic view of another embodiment of the motion generating means utilized, in an inspecting apparatus according to this invention, to create relative movement between the read-out indicator and workpiece surface along the true or theoretically perfect path.

With reference now to FIG. 7, the true-motion generating means there shown, includes a stationary spindle 13′ and a rotatably mounted disc 14′ which is mounted for movement in a planetary fashion about spindle 13′. That is, as disc 14′ moves about spindle 13′ it rotates about its center axis A-2 with its peripheral surface 14a′ in rolling contact with the peripheral surface 13a′ of spindle 13′. This rotating motion of disc 14′ is caused by the frictional forces existing at the point of contact $p(1)'$ between surfaces 13a′ and 14a′. The center axis of spindle 13′ is designated by reference numeral A-1′.

Whith this arrangement a fixed point $p(2)'$ on disc 14′ located eccentrically with respect to disc center axis A-2′ will follow a path spaced from and lying parallel to the path defined by a perfectly formed cavity wall surface of the stator part. And, a point $t'$ on disc 14′ spaced from point $p(2)'$ by a distance equal to the apex radius $a'$ will follow a path 12″ corresponding to the theoretically perfect contour which optimally should be exhibited by the cavity wall surface.

At the contact point $p(1)'$, the contacting surfaces $13a'$ and $14a'$ are tangent to each other; this tangent being represented by the line $T'$. A line $L-1'$ extending through contact point $p(1)'$ and through the describing point $t'$, as with previously described embodiment, also extends normal to the desired contour represented by line $12''$.

In the construction shown in FIG. 7, the diameter of spindle $13'$ is equal to twice the diameter of disc $14'$. As the disc $14'$ rolls around spindle $13'$, the point of contact $p(1)'$ therebetween will move along a circular path defined by the surface $13a'$; and the location of the points of engagement on the respective surfaces $13a'$, $14a'$ will change accordingly. The disc $14'$ will complete two revolutions as the point $p(1)'$ circumscribes surface $13a'$ once. Thus, after one complete revolution of the disc $14'$, the point $p(1)'$ will have moved through an angle of 180° along the surface $13a'$ of the spindle $13'$, as shown in FIG. 7. After the second complete revolution of the disc $14'$, the point $p(1)'$ will again be at its starting point; the describing point $t'$ having followed a path (indicated by line $12''$) corresponding to the desired contour during the planetary movement of disc $14'$ around spindle $13'$.

Figure 8:
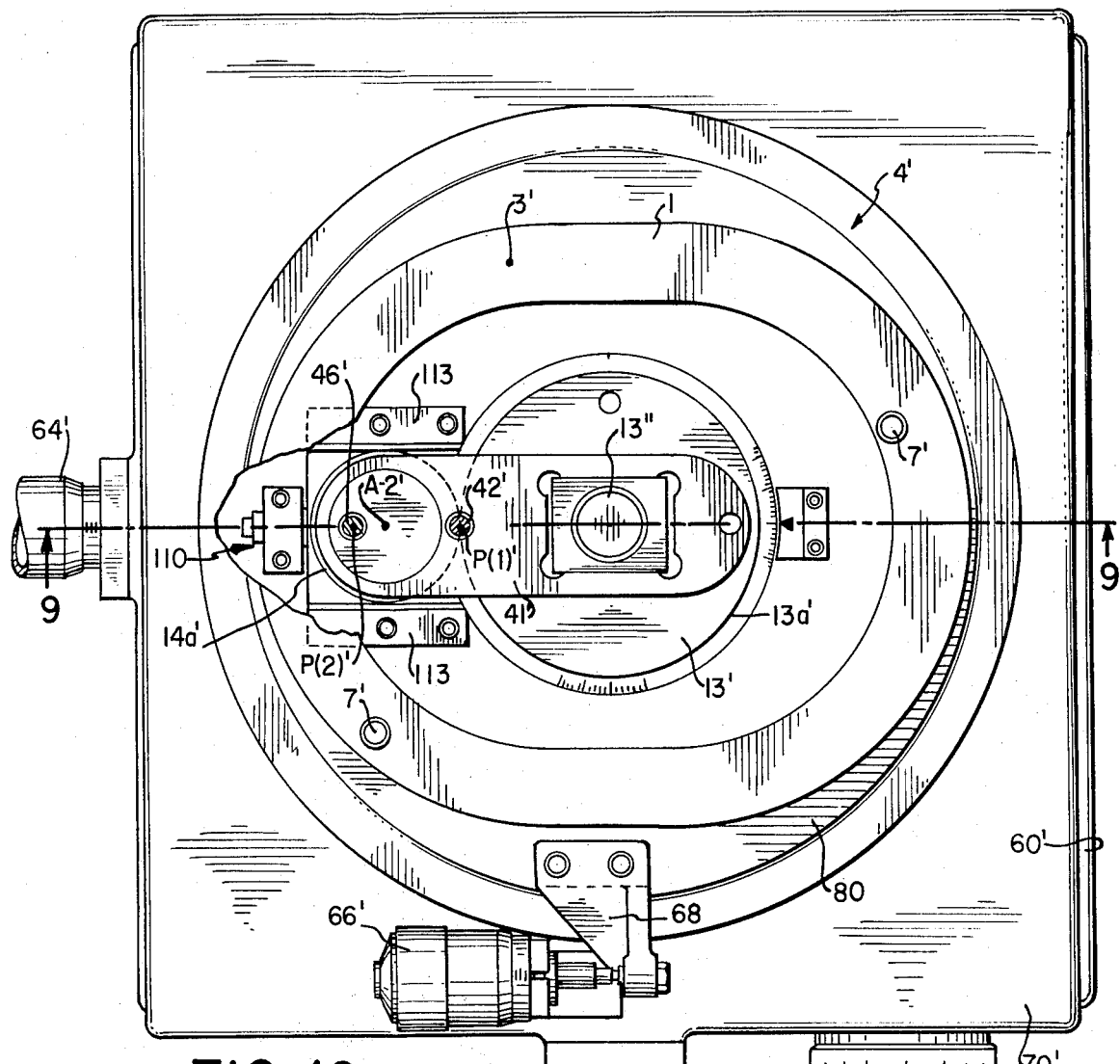
FIG. 8 is a top plan view of an inspecting apparatus according to this invention incorporating the motion generating means of FIG. 7.
Figure 9:
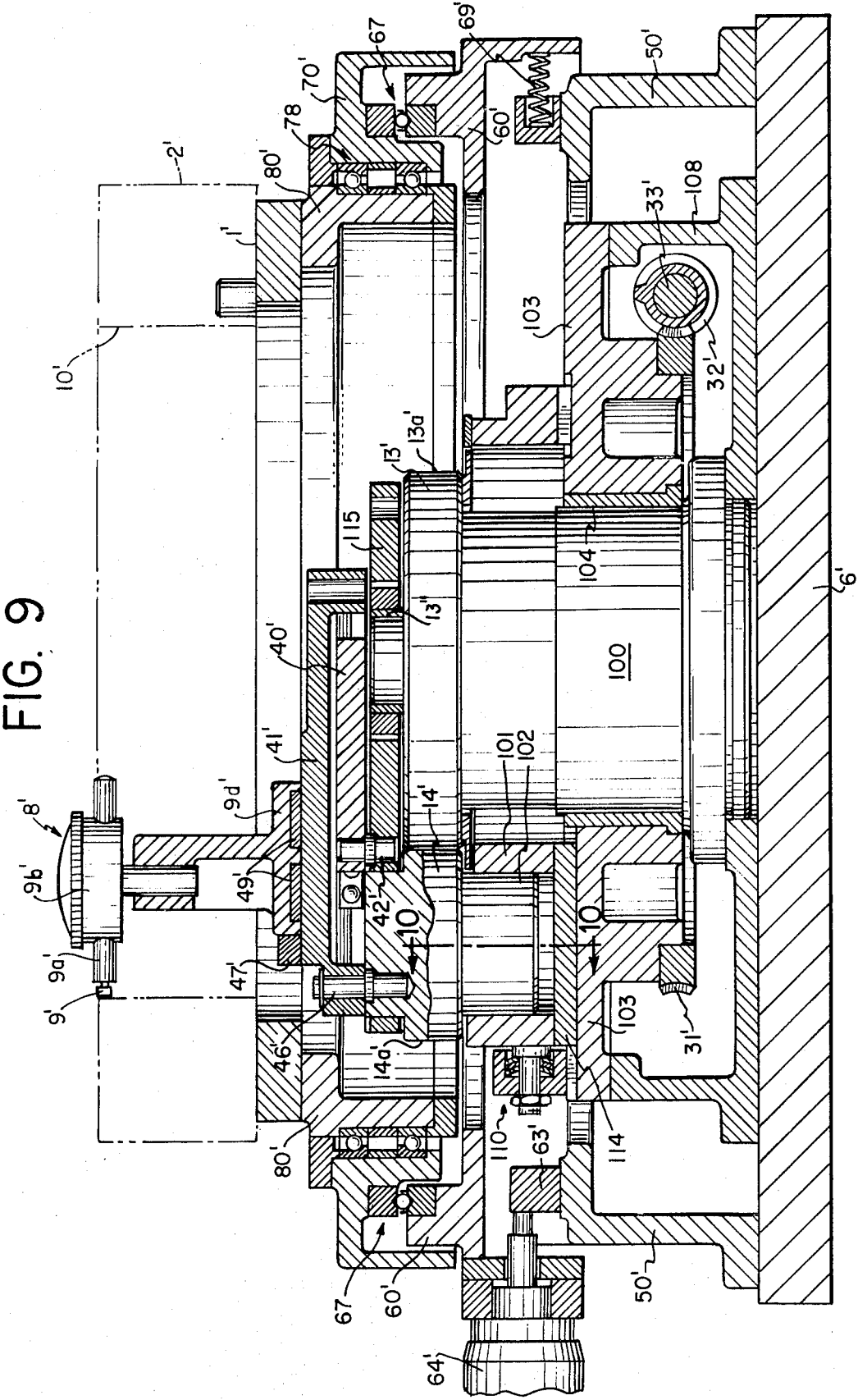
FIG. 9 is a cross-sectional view taken along the line 9—9 of FIG. 8.

Referring now to FIGS. 8 and 9, spindle $13'$ is fixed to a stationary hub 100 supported by base 6. The disc $14'$ is journalled for rotation on its center axis $A-2'$ in a bearing sleeve 101 which receives a reduced diameter portion 102 of disc $14'$. Bearing sleeve 101 is supported on a turntable 103 which is rotatably mounted on the lower portion of the hub 100 by a bearing sleeve 104. Turntable 103 carries a driven gear $31'$ which meshes with worm gear $32'$ mounted on shaft $33'$. Shaft $33'$ extends externally of gear housing 108 where it mounts a handwheel $34'$ for turning shaft $33'$. As shaft $33'$ is rotated, turntable 103 is rotated about hub 100. This, in turn, causes disc $14'$ to move in a planetary fashion about spindle $13'$ in the manner described above.

Figure 10:
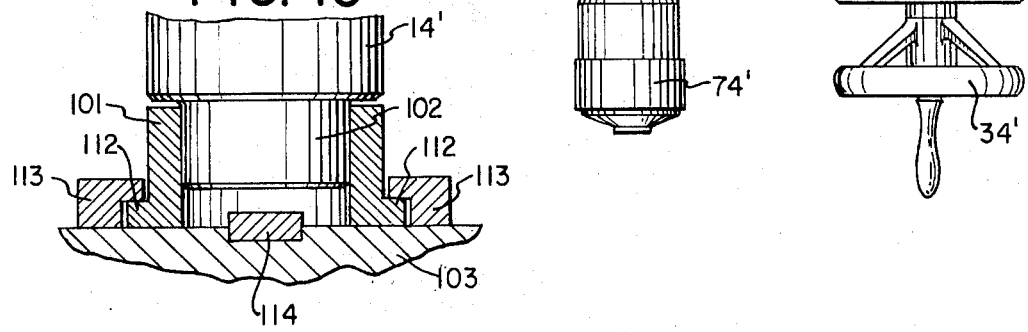
FIG. 10 is a cross-sectional view taken along the line 10—10 of FIG. 9.

As with the embodiment shown in FIGS. 1-6, it is important that no slippage occur between surfaces $13a'$ and $14a'$ during movement of the disc $14'$ about spindle $13'$. Although frictional forces between surfaces $13a'$ and $14a'$ are generally expected to be sufficient to maintain true rolling contact therebetween without slippage, a pressure exerting means 110 is provided to adjust the force of engagement between these surfaces in the event this frictional force becomes insufficient to maintain true rolling contact due to normal wear and tear. The pressure exerting means cooperates with the bearing sleeve 101 and acts to apply a force on disc $14'$ to urge it into contact with spindle $13'$. To permit movement of the disc $14'$ in response to this force, the bearing sleeve 101 which rotatably mounts disc $14'$ is itself mounted in a slide 112. The slide 112 is guided for movement in a radial direction relative to spindle $13'$ along a trackway defined by a guide member 113 and a key 114 mounted on turntable 103, as best shown in FIG. 10.

The slide-guide mounting read-out indicator $8'$ includes slide $41'$ and guide member $40'$. As with the construction shown in FIGS. 1-6, guide member $40'$ is pivotally mounted on pivot pin $42'$ seated in top plate 115, in turn, rotatably secured to spindle extension $13''$, as shown. The center axis of pivot pin $42'$ intersects contact point $p(1)'$. The slide is connected to disc $14'$ at the point $p(2)'$ for movement along the desired path by a pin $46'$ which also mounts slide $41'$ for pivotal movement relative to disc $14'$ to account for expected changes in the angular orientation of the slide-guide means. The read-out indicator $8'$ is held against positioning blocks, one of which is shown at $47'$, so that the nose of its sensing plunger $9'$ is aligned with the eccentric describing point $t$ on disc $14'$.

Figure 12:
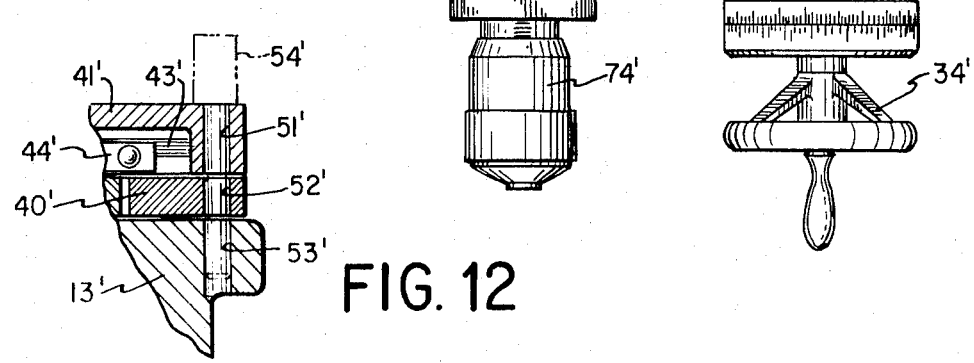
FIG. 12 is a cross-sectional view taken along the line 12—12 of FIG. 11.

Pre-alignment of the components of the true motion generating means is accomplished in essentially the same manner as previously described in connection with the construction shown in FIGS. 1-6. Here, however, the aligning holes $51'$, $52'$ and $53'$ are located in the slide $41'$, top plate 115 and spindle $13'$, respectively. When these holes are all aligned, the contact point $p(1)'$, center axis $A-1$ of spindle $13'$ and the describing point $t'$ will lie in a straight line. The aligned position of holes $51'$, $52'$ and $53'$ are shown in FIG. 12 where it will be noticed that alignment is determined by an alignment pin $54'$ as previously described.

In all other respects the operation of the inspecting apparatus shown in FIGS. 7-12 is the same as the operation of the embodiment of FIGS. 1-6.

Figure 11:
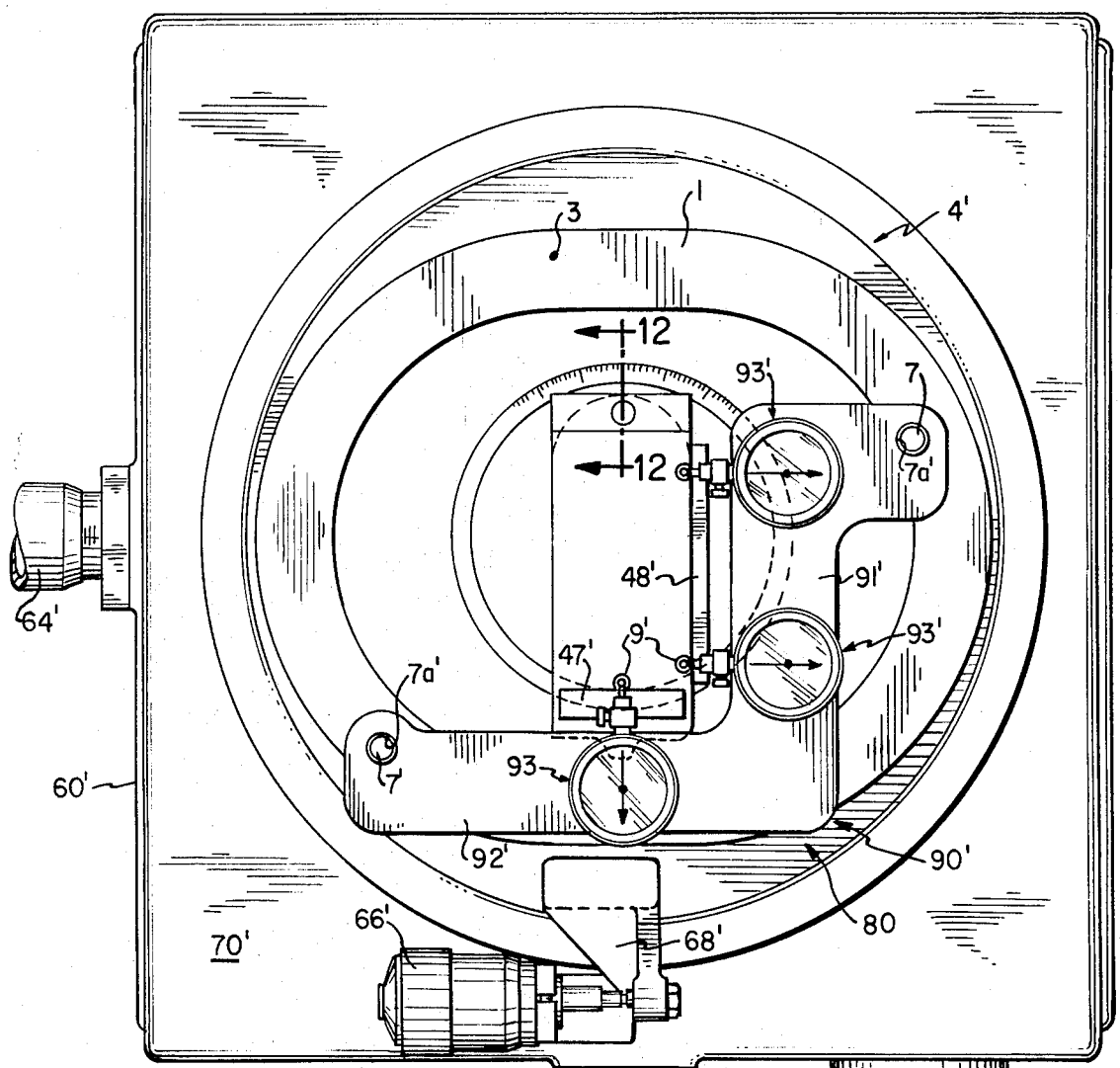
FIG. 11 is a top plan view of an inspecting apparatus according to the present invention showing a removable gauge in place on the apparatus for the purpose of prealigning the apparatus.

FIG. 11 shows the gauge $90'$ for pre-aligning workpiece supporting table $1'$ in place on locating dowels $7'$.

I claim:

1. Apparatus for inspecting a surface on a workpiece having a contour of changing radius of curvature along said surface, said apparatus comprising:
   a. a frame;
   b. a workpiece supporting table mounted on the frame;
   c. indicator means including a sensing member engaging along the surface of the workpiece to be inspected at a predetermined point lying along a predetermined line extending normal to the workpiece surface at said point, said sensing member being movable along said predetermined line in response to a positional variation in the surface of the workpiece to be inspected from a predetermined known contour; and
   d. motion generating means mounting the indicator means for movement relative to the workpiece surface along a path corresponding to said predetermined contour, said generating means including:
      2. a pair of cooperatively engaging members mounted for relative movement with respect to each other with the indicator means mounted on one of said members for movement along the path corresponding to said predetermined known contour as said members move relative to each other, neither of the contacting surfaces of said members alone having a contour corresponding to said predetermined contour,
      2. drive means for moving said members relative to each other, and 3. control means for continuously holding the sensing member for movement along said predetermined line during movement of the indicator means along said path to sense positional variations in the actual contour of the workpiece surface.

2. Apparatus according to claim 1 wherein:
   a. one of said cooperatively engaging members is fixedly mounted on the frame;

b. the other of said cooperatively engaging members is mounted for movement relative to the fixed member along its external surface; and
c. said drive means cooperates with the movably mounted member to move it along said external surface.

3. Apparatus according to claim 2 wherein:
a. said control means includes:
1. slide-guide means supporting the indicator means for reciprocal movement toward and away from the workpiece surface along said predetermined line.

4. Apparatus according to claim 3 wherein said slide-guide means includes:
a. a guide member mounted for pivotal movement about an axis intersecting the point of contact between said cooperatively engaging members; and
b. a slide member mounted on said guide member for sliding linear movement and for supporting the indicator means, said slide member being mounted for pivotal movement about an axis spaced from said predetermined point along said predetermined line.

5. Apparatus according to claim 2 further including:
a. support bearing means mounting the workpiece supporting table for selective angular adjustment relative to the motion generating means and for selective linear adjustment relative thereto along two horizontal axes disposed perpendicularly to each other.

6. Apparatus according to claim 2 wherein:
a. said first member comprises a hub element, the external surface of which has a circular configuration; and
b. said second member comprises an annular ring element the internal surface of which has a diameter greater than the diameter of the external surface of the hub element, the internal surface of the ring element being disposed in rolling engagement with the external surface of the hub element.

7. Apparatus according to claim 6 wherein:
a. said drive means for moving the movably mounted member along the exterior surface of said fixed member includes means for creating a resultant force urging the movably mounted member against the fixed member, said force lying along a line extending through the point of contact between the said members in a direction normal to a line drawn tangent to said point of contact.

8. Apparatus according to claim 6 wherein:
a. said drive means includes:
1. a bracket member mounted on the frame for rotational movement through a circular path about an axis coincident with the center axis of the hub,
2. a pair of spaced apart freely rotatable rollers carried by the bracket member, each of said rollers engaging the external surface of the ring element to create a resultant force urging the ring element against the hub element, said force lying along a line extending through the point of contact therebetween in a direction normal to a line drawn tangent to said point of contact, and
3. gear means for rotating said bracket member through said circular path.

9. Apparatus according to claim 8 wherein:
a. said motion generating means further includes gas bearing means axially supporting the ring element for friction free movement relative to the hub element.

10. Apparatus according to claim 8 wherein:
a. said control means includes:
1. slide-guide means supporting the indicator means for reciprocal movement toward and away from the workpiece surface along said predetermined line.

11. Apparatus according to claim 10 wherein:
a. said slide-guide means includes:
1. a guide member mounted for pivotal movement about an axis intersecting the point of contact between the hub element and the ring element, and
2. a slide member mounted on said guide member for sliding linear movement and for supporting the indicator means, said slide member being mounted for pivotal movement about an axis spaced from said predetermined point along said predetermined line.

12. Apparatus according to claim 2 wherein:
a. said first member comprises a hub element, the external surface of which has a circular configuration; and
b. said second member comprises a freely rotatable rolling element of circular configuration mounted for planetary movement about the hub element in rolling contact with the external surface of the hub element.

13. Apparatus according to claim 12 wherein:
a. said drive means for moving the movably mounted member along the exterior surface of said fixed member includes means for creating a resultant force urging the movably mounted member against the fixed member, said force lying along a line extending through the point of contact between the said members in a direction normal to a line drawn tangent to said point of contact.

14. Apparatus according to claim 12 wherein:
a. said drive means includes:
1. a turntable member mounted for rotation through a circular path about an axis coincident with the center axis of the hub element, said rolling element being mounted on said turntable member in radially spaced relationship with respect to said center axis, and
2. means for rotating said turntable member through said circular path.

15. Apparatus according to claim 14 wherein:
a. said control means includes:
1. slide-guide means supporting the indicator means for reciprocal movement toward and away from the workpiece surface along said predetermined line.

16. Apparatus according to claim 15 wherein:
a. said slide-guide means includes:
1. a guide member mounted for pivotal movement about an axis intersecting the point of contact between the hub element and the ring element, and
2. a slide member mounted on said guide member for sliding linear movement and for supporting the indicator means, said slide member being mounted for pivotal movement about an axis spaced from said predetermined point along said predetermined line.

* * * * *